United States Patent
Mehta et al.

(10) Patent No.: US 8,261,108 B2
(45) Date of Patent: *Sep. 4, 2012

(54) INFORMATION HANDLING SYSTEM INCLUDING WIRELESS SCANNING FEATURE

(75) Inventors: Pratik M. Mehta, Austin, TX (US); Luc Dinh Truong, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/048,409

(22) Filed: Mar. 15, 2011

(65) Prior Publication Data

US 2011/0167285 A1    Jul. 7, 2011

Related U.S. Application Data

(63) Continuation of application No. 11/839,390, filed on Aug. 15, 2007, now Pat. No. 7,937,597, and a continuation of application No. 10/805,716, filed on Mar. 22, 2004, now Pat. No. 7,275,165.

(51) Int. Cl.
  *G06F 1/26* (2006.01)
  *G06F 1/32* (2006.01)
(52) U.S. Cl. ........ 713/300; 713/310; 713/320; 713/324; 455/134; 455/145; 455/411; 455/434
(58) Field of Classification Search .................. 713/300, 713/310, 320, 324; 455/134, 145, 411, 434
See application file for complete search history.

(56) References Cited

U.S. PATENT DOCUMENTS

| | | | |
|---|---|---|---|
| 6,901,276 B1 | 5/2005 | Skinner et al. | |
| 6,943,667 B1 | 9/2005 | Kammer et al. | |
| 6,950,645 B1 | 9/2005 | Kammer et al. | |
| 7,079,830 B2 | 7/2006 | Critz et al. | |
| 7,275,165 B2* | 9/2007 | Mehta et al. | 713/310 |
| 7,502,635 B1* | 3/2009 | Horikoshi et al. | 455/574 |
| 7,937,597 B2* | 5/2011 | Mehta et al. | 713/300 |
| 8,122,136 B2* | 2/2012 | Bernier et al. | 709/229 |
| 2002/0077995 A1* | 6/2002 | Allison et al. | 707/1 |
| 2003/0013410 A1 | 1/2003 | Park | |
| 2003/0084210 A1 | 5/2003 | Wu et al. | |
| 2003/0144043 A1 | 7/2003 | Seo | |
| 2004/0029621 A1 | 2/2004 | Karaoguz et al. | |
| 2004/0097257 A1 | 5/2004 | Lee | |
| 2004/0102192 A1 | 5/2004 | Serceki | |
| 2004/0110530 A1 | 6/2004 | Alone et al. | |
| 2004/0203768 A1* | 10/2004 | Ylitalo et al. | 455/435.1 |

(Continued)

OTHER PUBLICATIONS

Acco Brands, Inc., "Kensington WiFi Finder Product Specification Sheet", 2003.

(Continued)

*Primary Examiner* — Vincent Tran
(74) *Attorney, Agent, or Firm* — Haynes and Boone, LLP

(57) ABSTRACT

An information handling system (IHS) is provided which includes a system processor and a wireless section coupled to the system processor. While the system processor remains in a reduced power state, the wireless section is operable to be powered up to detect the presence of a wireless network external to the IHS and determine if that detected wireless network matches a network included in profile information stored in a memory that is accessible by the wireless section. An indicator is coupled to the wireless section and is operable to provide an indication that a wireless network is present.

22 Claims, 2 Drawing Sheets

U.S. PATENT DOCUMENTS

| | | | |
|---|---|---|---|
| 2004/0204093 | A1 | 10/2004 | Imaeda |
| 2004/0214539 | A1 | 10/2004 | Rajamani et al. |
| 2005/0003765 | A1 | 1/2005 | Alfano et al. |
| 2005/0059349 | A1 | 3/2005 | Elliott |
| 2005/0059397 | A1 | 3/2005 | Zhao |
| 2005/0148332 | A1 | 7/2005 | Buckley et al. |
| 2005/0160287 | A1 | 7/2005 | Mehta et al. |
| 2005/0190747 | A1 | 9/2005 | Sindhwani et al. |
| 2005/0239463 | A1 | 10/2005 | Lagnado |

OTHER PUBLICATIONS

Dell Computer Corp., "Dell Latitude, D505 Series", 2004.
Intel Corporation, "How to Connect to a Public Hotspot", 2004.
Kensington Technology Group, "Kensington WiFi Finder", 2004.
Lawson, Stephen, "Windows XP Will Open to Bluetooth", PC World Communications, Inc., 2001.
Newbury Networks, "WiFi Watchdog", 2004.
Strietelmeier, Julie, "Gadgeteer Hands on Review: Smart ID WiFi Detector", www.the-gadgeteer.com, 2003.
Thorton, Carla, "Dell Latitude X300m, Ultraportable has a great design that accepts a number of expansion options", PC World Communications, Inc., 2003.
Wi-FI Networking News, "Review of WiFi Finder", 2003.
Wi-FI Networking News, "Kensington WiFi Loser?", 2003.
Rudis, Bob; Pocket-Sized Wireless Detection, Security Focus, Sep. 2, 2003, http://www.securityfocus.com/print/infocus/1727.
Pacchiano, Ronald, XP Know-How, Small Business Computing, Nov. 24, 2003, http://smallbusinesscomputing.com/webmaster/article.php/3112491.

* cited by examiner

INFORMATION HANDLING SYSTEM INCLUDING WIRELESS SCANNING FEATURE

CROSS REFERENCE TO RELATED APPLICATIONS

The present application claims priority to and is a continuation of co-owned, co-pending U.S. patent application Ser. No. 11/839,390 filed Aug. 15, 2007, which is a continuation of U.S. Pat. No. 7,275,165, issued Sep. 25, 2007, the disclosures of which are incorporated herein by reference.

BACKGROUND

The disclosures herein relate generally to information handling systems and more particularly to information handling systems that communicate using wireless technology.

As the value and use of information continue to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Today's IHSs often communicate with other IHSs via wireless connections that are made using technologies such as IEEE 802.11, Bluetooth and general packet radio service (GPRS), for example. Typically the IHS is fully powered up before it can make a determination as to whether or not a wireless network connection is present and available for communication in the IHSs locale. For example, a personal digital assistant (PDA), cell phone or portable computer is fully powered up before it can make a "wireless network present" determination. Fully powering up and booting an IHS such as a portable computer can take a significant amount of time before the "wireless network present" determination can be made. Such time delay can be very inconvenient for the user. Moreover, fully powering up a battery powered device to determine the presence of a wireless network can reduce battery operation time. Standalone wireless "finders" are currently available to determine the presence of a wireless network. Unfortunately the IHS user must pay the added expense of a wireless finder separate from the IHS when that approach is used. Such a standalone finder has the disadvantage of being yet one more device to carry when the IHS is used as a portable IHS. Moreover, the standalone finder has no coordination with the wireless transceiver in the IHS.

What is needed is an improved IHS that communicates using wireless technology.

SUMMARY

Accordingly, in one embodiment, a wireless card is disclosed that includes an indicator operable to provide an indication that a wireless network is present. A wireless card controller is coupled to the indicator, the wireless card controller being operable to detect the presence of a wireless network and determine if that detected network matches a network included in profile information that is stored in a memory accessible to the wireless card controller. The wireless card controller is operable to receive power from the IHS while a system processor in the IHS remains in a reduced power state. Upon a wireless network being detected, the wireless card controller directs the indicator to provide the indication.

In another embodiment, an IHS is disclosed that includes a system processor and a wireless section coupled to the system processor. While the system processor remains in a reduced power state, the wireless section is operable to be powered up to detect the presence of a wireless network external to the IHS and determine if that detected wireless network matches a network included in profile information stored in a memory that is accessible by the wireless section. An indicator is coupled to the wireless section and is operable to provide an indication that a wireless network is present.

DETAILED DESCRIPTION

Figure 1:
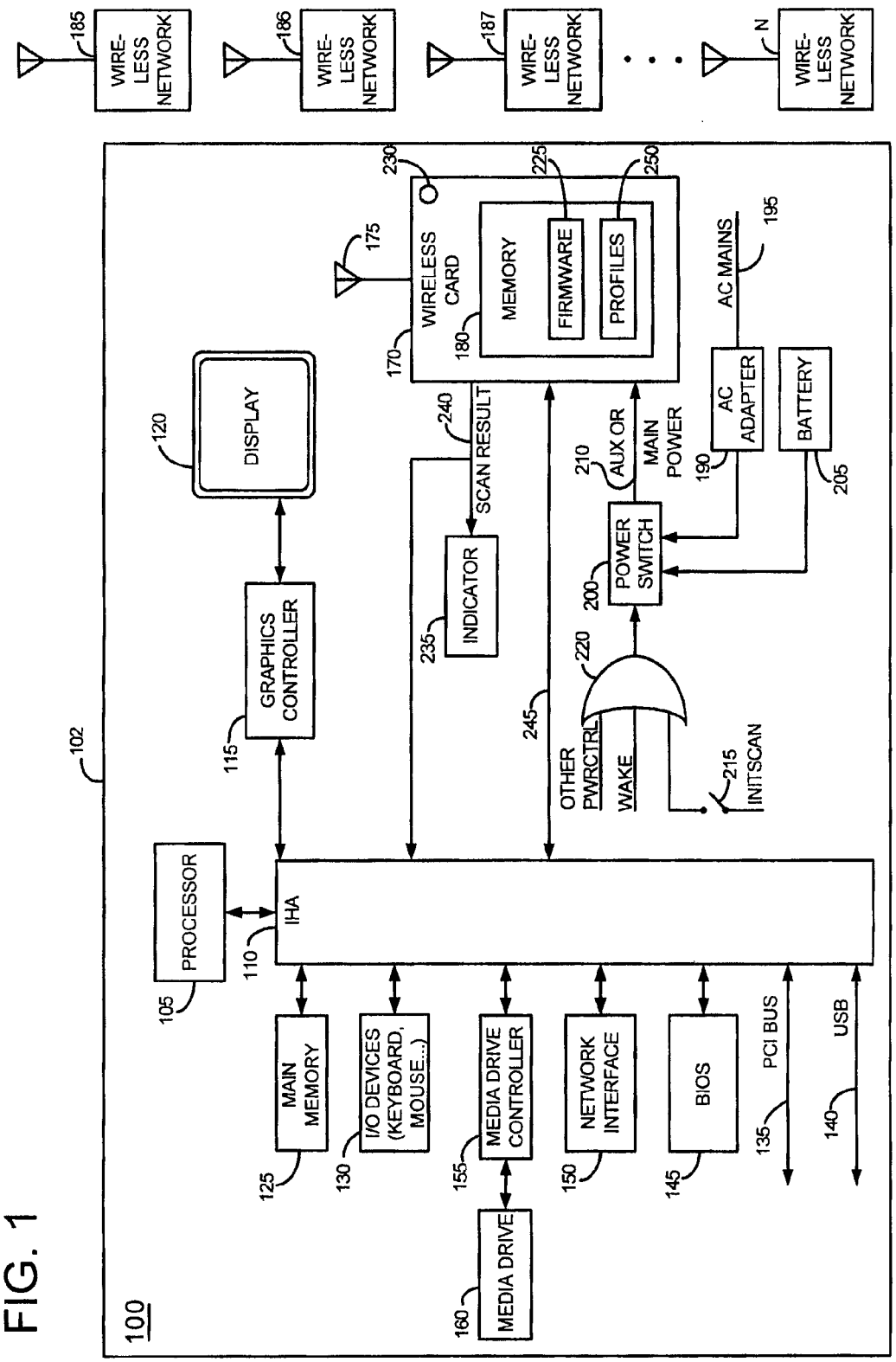
FIG. 1 is a block diagram of an embodiment of the disclosed IHS.

FIG. 1 is a block diagram of the disclosed IHS 100. For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a video display, a keyboard, a mouse, voice inputs and other human interface devices (HIDs). The IHS may also include one or more buses operable to transmit communications between the various hardware components.

In one embodiment, IHS 100 is a portable system such as a notebook, laptop, PDA or other portable, battery-powered system. IHS 100 includes a processor 105 such as an Intel Pentium series processor or one of many other processors currently available. An Intel Hub Architecture (IHA) chipset 110 provides IHS 100 with glue-logic that connects processor 105 to other components of IHS 100. Chipset 110 carries out graphics/memory controller hub functions and I/O functions. More specifically, chipset 110 acts as a host controller which communicates with a graphics controller 115 coupled thereto. Graphics controller 115 is coupled to a display 120. Chipset 110 also acts as a controller for main memory 125 which is coupled thereto. Chipset 110 further acts as an I/O controller hub (ICH) which performs I/O functions. Input devices 130 such as a mouse, keyboard, and tablet, are also coupled to chipset 110 at the option of the user. An expansion bus 135, such as a Peripheral Component Interconnect (PCI)

bus, PCI Express bus, SATA bus or other bus is coupled to chipset 110 as shown to enable IHS 100 to be connected to other devices which provide IHS 100 with additional functionality. A universal serial bus (USB) 140 or other I/O bus is coupled to chipset 110 to facilitate the connection of some peripheral devices to IHS 100. System basic input-output system (BIOS) 145 is coupled to chipset 110 as shown. BIOS software 145 is stored in nonvolatile memory such as CMOS or FLASH memory. A network interface controller (NIC) 150 is coupled to chipset 110 to facilitate connection of system 100 to other IHSs. A media drive controller 155 is coupled to chipset 110 so that devices such as media drive 160 can be connected to chipset 110 and processor 105. Devices that can be coupled to media drive controller 155 include CD-ROM drives, DVD drives, hard disk drives and other fixed or removable media drives. IHS 100 includes an operating system which is stored on media drive 160. Typical operating systems which can be stored on media drive 160 include Microsoft Windows XP, Microsoft Windows 2000 and the Linux operating systems. (Microsoft and Windows are trademarks of Microsoft Corporation.) It should be understood that the technology disclosed herein is not only applicable to the embodiment of FIG. 1 but is also applicable to the other types of IHSs described above.

IHS 100 includes a housing 102 in which the components of the IHS are situated. IHS 100 includes a wireless card 170 that is coupled to chipset 110 as shown. Wireless card 170 is modular and is plugged into a mating connector (not shown) in the IHS. Other embodiments are possible wherein the functionality of wireless card 170 is integrated in a motherboard or other circuit board within IHS 100. An antenna 175 is coupled to wireless card 170. Wireless card 170 includes a nonvolatile memory 180 for storing firmware 225 and/or other information that governs the operation of card 170 as it transmits and receives information from a wireless network 185.

Wireless card 170 is capable of detecting the presence of usable local wireless networks such as network 185 even when IHS 100 is powered down or in a reduced power state such as a suspend mode. In other words, it is not necessary to fully power up IHS 100 to determine the presence of a usable local wireless network. Sections of IHS 100 other than wireless card 170 can be powered down or operating in a reduced power state and yet wireless card 170 is still capable of detecting the presence of a wireless network or networks. Depending on the particular application, wireless card 170 is capable of detecting the presence of an IEEE 802.11, Bluetooth, or GPRS wireless network. Of course other embodiments are possible where wireless card 170 is capable detecting wireless networks using other protocols as well. Moreover, wireless card 170 may take the form of a plug-in module or may be integrated within the IHS. The term "wireless section" includes wireless cards, wireless modules and other wireless circuitry within the IHS, whether integrated or non-integrated.

An AC adapter 190 is coupled to AC mains 195 and to power switch 200. A battery 205 is coupled to power switch 200 to provide IHS 100 with an alternative source of power. Power switch 200 is coupled to wireless card 170 to provide wireless card 170 with either main power or auxiliary (AUX) power. In other words, wireless card 170 can be coupled to a main power rail and/or an auxiliary power rail which are indicated collectively as rail 210. The auxiliary power rail is a power rail which may provide less current than the main power rail and may be available when the main power is off. The auxiliary power rail is connected to a subset of the entire IHS 100, namely wireless card 170 and thus draws less power than if the entire IHS 100 were powered. Main power goes to all subsystems in the IHS whereas auxiliary power may not. Auxiliary power may be provided to a particular subsystem or particular subsystems of the IHS.

Power switch 200 provides power to wireless card 170 upon the occurrence of a particular event, such as for example the user pressing an initialize scan (INITSCAN) button or switch 215. Initialize scan switch 215 is coupled to an input of a three input OR gate 220, the output of which is coupled to power switch 200. When the user closes initialize scan switch 215, power switch 200 provides adapter or battery power to wireless card 170. Wireless card 170 is thus provided power without the need to fully power up the entire remainder of IHS 100. Stated alternatively, the wireless section of the IHS is powered without the need to fully power the remaining sections or portions of the IHS. The remaining sections of the IHS can be in a reduced power state such as a suspend state or an off state and wireless card 170 can still detect the presence of a wireless network nearby. An embodiment is contemplated wherein the user's action is not needed to activate scan switch 215 to initiate a scan. For example, the IHS can be configured such that a scan is initiated at predetermined fixed or variable time intervals.

In one embodiment, wireless card 170 executes firmware 225 stored in its memory 180. Firmware 225 directs wireless card 170 to listen for the presence of local wireless networks. This can be done by wireless card 170 listening for beacon signals from such networks. In another embodiment, firmware 225 directs wireless card 170 to listen for the presence of wireless networks which are available for use by IHS 100, namely those wireless networks that IHS 100 is authorized to use or indicated in pre-configured profiles 250 that identify preferred networks. When wireless card 170 detects the presence of such a wireless network, it provides an indication to the user that such a wireless network is present. For example, an integrated indicator 230, such as an LED, that is built into wireless card 170 may be lit to signal the presence of an available wireless network 185. In another embodiment, an indicator 235 is coupled to wireless card 170 via a scan result bus 240. Scan result bus 240 transmits information to indicator 235 such as the presence, type and signal strength of a detected wireless network. Scan result bus 240 can also provide the names of detected wireless networks and their respective signal strengths. In embodiments where indicator 235 shows the presence of one or more wireless networks, multiple LEDs can be used to provide this indication. However, for embodiments where the names of accessible networks are to be provided, indicator 235 can be a more complex display such as an LCD display, for example, which is capable of displaying alphanumeric textual information. In embodiments where it is desirable to display even more complex information to the user, scan result bus 240 is coupled to chipset 110 so that the information can be displayed on display 120 which is a relatively large display capable of displaying complex information. In this instance a larger portion of IHS 100 is powered up as needed to accommodate transmission and display of scan result information on display 120. In notebook, laptop, PDA and other similar IHSs, display 120 is typically integrated in the IHS. In one embodiment, indicator 235 is variable or scalable. For example, indicator 235 can indicate the high or low signal strength of a particular wireless network. In any particular location there may be multiple wireless networks present, such as wireless networks 185, 186, 187 . . . N wherein N is the total number of wireless networks which can be heard at a particular location. One or more of these networks may be preferred by the user as so indicated by the user in a profile 250 stored in the IHS.

While OR gate 220 is indicated as a discrete element, the logical function of the OR gate can also be implemented in firmware or software. OR gate 220 also includes a WAKE signal input. When a WAKE signal is asserted on the WAKE input of OR gate 220, wireless card 170 is turned on so it can be responsive to any wake-on-wireless LAN activity. It is necessary to turn wireless card 170 on to provide this wake-on-wireless LAN functionality. Thus, after being turned on in this manner, when wireless card 170 detects wireless activity it sends information back to IHA 110 via data/control bus 245 to instruct remaining sections of the IHS other than wireless card 170 to wake from a reduced power state such as a suspend state. OR gate 220 includes an OTHER PWRCTRL input to which a signal is provided if it desired to turn on wireless card 170 for any other reason.

One or more profiles 250 are stored in memory 180. For example, a work profile and a home profile can be stored in memory 180. The profile can include the name of a network. For example, the work profile may include the name of the wireless network used at the user's place of employment. The home profile may include the name of the user's home wireless network. When wireless card 170 is powered up, as for example occurs when initialize scan switch 215 is closed by the user or the WAKE input is otherwise activated, then wireless card 170 scans or looks for the presence of wireless networks whose names, or other identifying indicia, are specified in the profiles 250 stored in memory 180. Because the profiles are stored within wireless card 170 itself, wireless card 170 is capable of self-determining whether or not the wireless networks specified in profiles 250 are present and available to the user of IHS 100.

Figure 2:
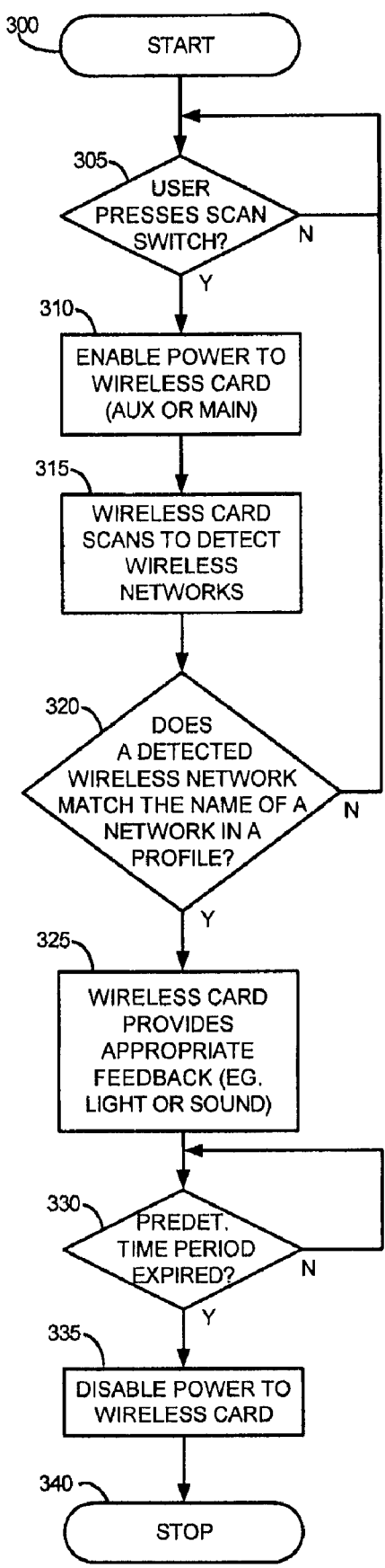
FIG. 2 is a flowchart depicting an embodiment of the process flow in the disclosed IHS.

FIG. 2 is a flowchart which depicts process flow in IHS 100 as it searches to detect the presence of an available wireless network which is usable by IHS 100. The steps depicted in FIG. 2 can be implemented by IHS 100 without powering up all of the circuitry of IHS 100. The firmware 225, that governs the operation of wireless card 170 is it searches for wireless connections, may be implemented as a state machine in hardware if desired. It is also noted that memory 180 which contains firmware 225 may optionally be located at other locations in IHS 100 than wireless card 170 as long as the firmware is available to govern the operation of wireless card 170. As seen in the FIG. 2 flowchart, process flow starts at start block 300. A test is then conducted in decision block 305 to determine if initialize scan switch 215 has been activated by the user. It is noted that scan switch activation can be viewed as an event. If scan switch 215 has not been activated then the test continues to run. However, if the user has activated or pressed initialize scan switch 215, then main power or auxiliary power is enabled to wireless card 170 as per block 310. In response, wireless card 170 powers up and starts scanning to detect wireless networks as per block 315. At this point, wireless card 170 is powered up and remaining sections of the IHS are not supplied power or are in a reduced power or suspend state. When wireless card 170 detects the presence of a wireless network, then a test is conducted to determine if the particular detected wireless network is usable by IHS 100 as per decision block 320. For example, decision block 320 may determine if IHS 100 is authorized or configured to access the particular detected wireless network. In making this determination, decision block 320 can access profiles 250 stored in memory 180 to determine if any of the network names stored in the profiles matches a name of a detected wireless network. If no match is detected, then in one embodiment, process flow continues back to decision block 305 at which the IHS continues to monitor for a pressing of the initialize scan switch 215. However, if a match is found between a network name in a profile and the name of one of the detected networks, then wireless card 170 provides appropriate feedback to the user as per block 325. For example, an indicator 235 such as an LED can be lit to signify that a wireless network has been detected. The indicator can be integrated in wireless card 170 in a fashion such that it is still visible to the user when the wireless card is plugged into IHS 100. Alternatively, the indicator can be placed at another location on IHS 100 that will be visible to the user. A more sophisticated indicator such as an LCD display can be used as indicator 235 to display the name of a detected network which matches a name in a stored profile. In that case, the wireless network is designated as a detected and available wireless network. Indicator 235 can also display the signal strength of a particular detected wireless network 185 or multiple detected wireless networks as well as the names of the particular detected available wireless networks. Other forms of feedback can also be used as indicator 235. For example, different sounds can be used to indicate that a wireless network is detected. After the indication is provided as described above, the IHS then waits for a predetermined period of time before withdrawing power and shutting down wireless card 170. More particularly, a test is conducted at decision block 330 to determine if the time period has expired. The time period is selected to be sufficiently long to enable the user enough time to be cognizant of the indication. Once the time period expires, power is withdrawn from wireless card 170 thus turning the wireless card off as per block 335. The process ends at stop block 340. However, the process can restart by again commencing to monitor for an activation of initialize scan switch 215 as per block 305.

Many variations of the disclosed IHS are possible. For example, initialize scan switch 215 of FIG. 1 can take different forms such as a dedicated physical switch or a shared physical switch. The scan switch can also be a key combination of a keyboard (not shown) plugged into IHS 100 as an I/O device. The scan switch can also be part of a multi-function switch or a programmable key/button. Scan switch 215 can also be closed in response to a voice command or other user input method to initiate a scan.

The profiles discussed above indicate the preferred networks on which the user indicates that his or her IHS is to operate. Memory 180 stores these profiles. More particularly, memory 180 stores sufficient profile or preferred network information to enable wireless card 170 to independently determine matches between the detected wireless networks and those wireless networks that the user has indicated are preferred. This determination is made independently by wireless card 170 in the sense that the entire IHS need not be fully powered up to make this determination. This has the advantage that the user is more quickly apprised of detected available wireless networks since the IHS does not need to be fully powered up. Both power and time are saved in one embodiment. In one embodiment, if greater functionality is desired, for example to display feedback on display 120, then a greater portion or more sections of the IHS can be powered up. It is also noted that IHS 100 can detect wireless networks prior to BIOS being loaded, prior to device enumeration and/or prior to the operating system being loaded.

It is also noted that not the entire wireless card 170 needs to be powered up to perform the wireless network detection function. In one embodiment, wireless card 170 includes a receive section and a transmit section. The receive section is powered up to look for and detect available wireless networks 185. Power is saved by leaving the transmit section off. In this embodiment the scanning action of the wireless card is passive in that the card receives, namely it listens without transmitting. In another embodiment, both the transmit and receive sections of wireless card 170 are powered. In this case the scanning action of the card is active and the transmitter section is operational. One example when this method is advantageous is to cover both broadcast and non-broadcast service set identifier (SSID) network configurations. A broadcast SSID network configuration is one in which the wireless network broadcasts a radio beacon signal which includes the SSID, in effect saying "I am the network Y". A non-broadcast SSID network configuration is one in which the wireless network does not send out the SSID information in the radio beacon signal, but rather the wireless network listens for a query "Are you the network Y?" and if such a query is received, the wireless network sends a reply which in effect communicates that "Yes, I am the network Y".

Moreover, the scan result can be fed back from wireless card 170 to an indicator by different methodologies. Serial encoded scan result information can be fed back along scan result bus 240 to indicator 235 or another indicator. This serially coded information can drive a shift register or LCD displays. A serial bus such as SMBus or other bus implementations can be used to provide scan result feedback to an indicator which is perceivable by the user. When the IHS is in the form of a laptop, notebook computer or other IHS which folds to close, the scan switch and indicator are preferably positioned to be externally visible or accessible to the user such that the user need not open the IHS to use the disclosed wireless network detection feature of the IHS.

Advantageously, in one embodiment, the disclosed methodology and apparatus provide a way for an IHS to detect the presence of a wireless network usable for communication without powering up the entire IHS. While in the example discussed above, a wireless card is employed in IHS 100, it should be understood that the functionality of the wireless card can be implemented as an integral part of the IHS. A separate removable wireless card or module need not be employed. It is also noted that the wireless card can be activated at various time intervals without user intervention to monitor for wireless networks.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. A portable device, comprising:
   one or more processors;
   a wireless section coupled to the one or more processors;
   wherein, while the one or more processors remain in a reduced power state, the wireless section is operable to receive power and detect the presence of a wireless network external to the portable device and determine if that detected wireless network matches a network included in profile information stored in a memory that is accessible by the wireless section; and
   an indicator that is coupled to the wireless section and is operable to provide an indication that a wireless network is present.

2. The device of claim 1, wherein the portable device is Personal Digital Assistant (PDA).

3. The device of claim 1, wherein the portable device is a phone.

4. The device of claim 1, wherein the indicator comprises a display.

5. The device of claim 4, wherein the display is a Liquid Crystal Display (LCD).

6. The device of claim 4, wherein the display is operable to provide alphanumeric textual information.

7. The device of claim 4, wherein the display is operable to display that a wireless network that is present is a preferred wireless network.

8. The device of claim 4, wherein the display is operable to display that a wireless network that is present is an authorized wireless network.

9. The device of claim 4, wherein the display is operable to display a location associated with a wireless network that is present.

10. The device of claim 4, wherein the display is operable to display that a wireless network that is present is a broadcasting wireless network.

11. The device of claim 4, wherein the display is operable to display that a wireless network that is present is a non-broadcasting wireless network.

12. The device of claim 4, wherein the display is operable to display a technology type of a wireless network that is present.

13. The device of claim 4, wherein the display is operable to display a signal strength of a wireless network that is present.

14. The device of claim 4, wherein the wireless section is operable to detect the presence of a plurality of wireless networks to determine if the plurality of detected wireless networks match a plurality of networks included in the profile information, and the display is operable to provide an indication that a plurality of wireless networks are present.

15. The device of claim 14, wherein the display is operable to display a name of each of the plurality of wireless networks that are present.

16. The device of claim 14, wherein the display is operable to display a signal strength of each of the plurality of wireless networks that are present.

17. The device of claim 14, wherein the display is operable to display a preferred status of each of the plurality of wireless networks that are present.

18. The device of claim 14, wherein the display is operable to display an authorized status of each of the plurality of wireless networks that are present.

19. The system of claim 14, wherein the display is operable to display a location of each of the plurality of wireless networks that are present.

20. The system of claim 14, wherein the display is operable to display a technology type of each of the plurality of wireless networks that are present.

21. A method of operating a portable device, comprising:
   providing power to a wireless section of a portable device to detect a presence of a wireless network while each of one or more processors in the portable device remain in a reduced power state; and
   determining, while each of the one or more processors remains in the reduced power state, if a detected network matches a network included in profile information stored in a memory that is accessible to the wireless section.

22. A phone, comprising:
   one or more processors;
   a wireless section coupled to the one or more processors;
   wherein, while the one or more processors remain in a reduced power state, the wireless section is operable to receive power and detect the presence of a wireless network external to the phone and determine if that detected wireless network matches a network included in profile information stored in a memory that is accessible by the wireless section; and
   a display that is coupled to the wireless section and is operable to display a name and a signal strength of a wireless network that is present.

* * * * *